US008263712B2

(12) United States Patent
Baugh et al.

(10) Patent No.: US 8,263,712 B2
(45) Date of Patent: Sep. 11, 2012

(54) PRODUCTION OF ELASTOMERIC FUNCTIONALIZED OLEFIN POLYMERS

(75) Inventors: Lisa Saunders Baugh, Ringoes, NJ (US); Enock Berluche, Phillipsburg, NJ (US); Karla Schall Colle, Magnolia, TX (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 1044 days.

(21) Appl. No.: 12/231,384

(22) Filed: Sep. 2, 2008

(65) Prior Publication Data

US 2009/0062475 A1 Mar. 5, 2009

Related U.S. Application Data

(60) Provisional application No. 60/967,406, filed on Sep. 4, 2007.

(51) Int. Cl.
*C08F 8/04* (2006.01)
*C08G 61/08* (2006.01)
*C08F 4/80* (2006.01)
*C07C 255/31* (2006.01)

(52) U.S. Cl. ............... 525/328.2; 525/328.5; 525/328.6; 525/329.5; 525/338; 525/940; 526/286; 526/297; 526/309

(58) Field of Classification Search .................. 526/286, 526/309, 338, 297; 525/328.2, 338, 328.5, 525/328.6, 329.5
See application file for complete search history.

(56) References Cited

U.S. PATENT DOCUMENTS

| | | | | |
|---|---|---|---|---|
| 3,856,758 | A | 12/1974 | Ueshima et al. | |
| 3,859,265 | A | 1/1975 | Hepworth | |
| 3,980,626 | A | 9/1976 | Hepworth | |
| 3,991,139 | A | 11/1976 | Kokuryo et al. | |
| 4,105,608 | A | 8/1978 | Nakamura et al. | |
| 4,698,403 | A | 10/1987 | Klabunde | |
| 4,906,754 | A | 3/1990 | Klabunde | |
| 5,030,606 | A | 7/1991 | Klabunde | |
| 5,175,326 | A | 12/1992 | Klabunde | |
| 5,866,663 | A * | 2/1999 | Brookhart et al. | 526/170 |
| 6,197,894 | B1 | 3/2001 | Sunaga et al. | |
| 7,858,710 | B2 * | 12/2010 | Wagener et al. | 525/328.9 |
| 2005/0043541 | A1 | 2/2005 | Walter et al. | |
| 2005/0137369 | A1 | 6/2005 | Baugh et al. | |

FOREIGN PATENT DOCUMENTS

| | | | |
|---|---|---|---|
| JP | 47001774 | B | 1/1972 |
| JP | 60049051 | A | 3/1985 |
| JP | 63317520 | A | 12/1988 |
| WO | WO0172760 | A1 | 10/2001 |
| WO | WO03/062253 | A1 | 7/2003 |

OTHER PUBLICATIONS

Stumpf, et al, "Ruthenium-based Catalyst for the Ring Opening Metathesis Polymerisation of Low-strain Cyclic Olefins and of Functionalised Derivatives of Norbornene and Cyclooctene," J. Chem. Soc., Chem. Commun., 1995, 1127-1128.*
Hillmyer, Marc A., et al., "Ring-Opening Metathesis Polymerization of Functionalized Cyclooctenes by a Ruthenium-Based Metathesis Catalyst", *Macromolecules* 1995, 28, 6311-6316.
Nowakowska, Maria; et al., "Possibility of Copolymerization of Ethylene with Acrylonitrile upon Organometallic Complexes", *Polimery* 1962, 7(4), 125-8.
Nowakowska, Maria, et al., "Copolymerization of Ethylene with Acrylonitrile", Inst. Ciezkiej Syntezy Organicznej, Blachownia, Pol, *Polimery* 1964, 9(12), 516-20.
Ivancheva, N.I. et al., "Characteristics of Copolymerization of Ethylene with Acrylonitrile using a Diethylaluminum Chloride + Triethyl Vanadate (A1C2H5)2C1 + VO(OC2H5)3) Catalytic System", *Plasticheskie Massy* 1976, (12), 16-18.
Matkovskii, P. E. et al., "Catalytic Copolymerization of Ethylene with Acrylonitrile", Inst. Khim. Fiz., Moscow, USSR, *Izvestiya Akademii Nauk SSSR, Seriya Khimicheskaya* 1970, (6), 1311-18.
Ohno, M. et al., *J. Org. Chem.* 1988, 53, 1285-1288.
Giese, B., *Angew. Chem. Int. Ed. Engl.* 1985, 24, 553-565.
Giese, B., *Angew. Chem. Int. Ed. Engl.* 1983, 22, 753-764.
Yoshida, Y. et al., *J. Appl. Polym. Sci.* 1997, 66, 367-375.
Matsumoto, S. et al., *Am. Chem. Soc.*, Symp. Ser., 1977, 59, 303-317.
Matsumoto, S., et al., *Am. Chem. Soc.*, Polym. Prepr., 1977, 18, 110-115.
Bazan, G. C. et al., *Macromolecules* 1991, 24, 817-823.
Nishihara, Y. et al., *Polym. J.* 1997, 39, 318-329.
Padwa, A. R., *Progr. Polym. Sci.* 1989, 14, 811-833.
Mudalige, D. C. et al., *J. Macromol. Sci., Pure Appl. Chem.* 1997, A32, 361-368.
Shin, S.-Y. et al., *Polym. Mat. Sci. Eng.* 2004, 91, 100-101.
Kochi, T. et al., *J. Am. Chem. Soc.* 2007, 129, 8948-8949.
Marques, M. M. et al., *Polym. Int.* 2001, 50, 579-587.
M.F. Schneider, C. Gantner, W. Obrecht and O. Nuyken, Ring-Opening Metathesis Polymerization of Nitrile Substituted cis-Cyclooctenes, Macromol. Rapid Commun., 2010, pp. 1731-1735, 31.

* cited by examiner

*Primary Examiner* — Fred M Teskin
(74) *Attorney, Agent, or Firm* — Robert A. Migliorini

(57) ABSTRACT

In a process for producing a functionalized polyalkenamer, at least one monomer comprising a monocyclic olefin having at least one pendant alkyl group bonded thereto, wherein the pendant alkyl group has at least two carbon atoms and is substituted with a polar moiety spaced by at least one carbon atom from the monocyclic olefin, is contacted with a polymerization catalyst under conditions effective to effect ring opening polymerization of the monocyclic olefin and produce the functionalized polyalkenamer.

10 Claims, 1 Drawing Sheet

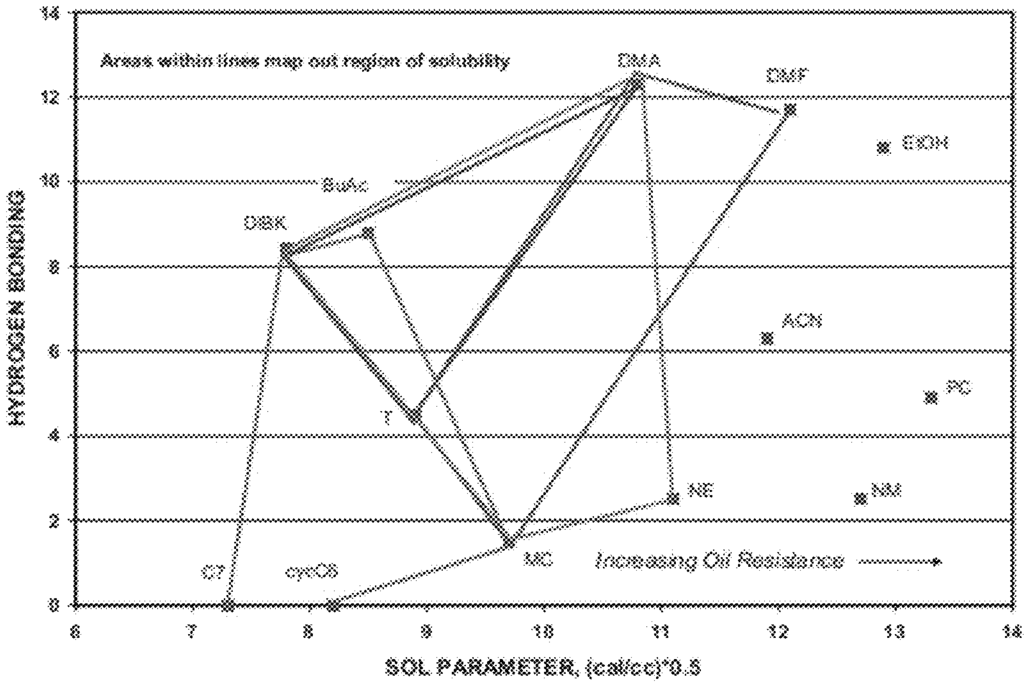
Areas within lines map out region of solubility
DMA
DMF
BuAc
DIBK
T
ACN
PC
NE
NM
C7
cycC6
MC
Increasing Oil Resistance
HYDROGEN BONDING
SOL PARAMETER, (cal/cc)*0.5
0
2
4
6
8
10
12
14
6
7
8
9
10
11
12
13
14

PRODUCTION OF ELASTOMERIC FUNCTIONALIZED OLEFIN POLYMERS

CROSS-REFERENCE TO RELATED APPLICATIONS

This is a Non-Provisional Application that claims priority to U.S. Provisional Application 60/967,406 filed Sep. 4, 2007, which is herein incorporated by reference.

FIELD

This invention relates to a process for producing elastomeric functionalized olefin polymers.

BACKGROUND

Polyolefin-based elastomers having good fluid and heat resistance are a target of great commercial interest since such materials have potential to serve as cost-advantaged competitors to commercial oil-resistant elastomers, such as nitrile rubber (NBR), hydrogenated nitrile rubber (HNBR), and thermoplastic vulcanizates (TPVs), such as Santoprene. In contrast, ethylene-propylene-diene monomer (EPDM) copolymers and other polyolefin-based elastomers do not have sufficient oil resistance to compete in the specialty elastomer market.

The incorporation of functional groups into polyolefins—particularly nitrile groups—is predicted to substantially enhance their fluid resistance. However, the controlled synthesis of nitrile-containing polyolefins through the direct copolymerization (metallocene/Ziegler-Natta, late transition metal, or free-radical) of olefins with acrylonitrile or nitrile-functionalized α-olefins is not currently feasible on a level providing useful catalyst productivities, controlled polymer microstructures, and desirable base polymer properties (see, for example, Padwa, A. *Prog. Polym. Sci.* 1989, 14, 811-833 and references therein; Mudalige, D. C.; Rempel, G. L. *J. Macromol. Sci.—Pure Appl. Chem.* 1997, *A*34, 361-368; Shin, S.-Y. A. et al. *Polym. Mat. Sci. Eng.* 2004, 91, 100-101; Kochi, T. et al. *J. Am. Chem. Soc.* 2007, 129, 8948-8949; Marques, M. M. et al. *Polym. Int.* 2001, 50, 579-587; and U.S. Pat. No. 4,698,403. This is due both to orbital mismatch energies between the monomers and/or the tendency of the nitrile group to poison metal catalyst centers through coordination or side reactions. Typically, olefin/acrylonitrile or olefin/nitrile-functionalized α-olefin copolymers are limited to materials containing small amounts of nitrile comonomer (<6 mol %), alternating copolymers with base properties unlike those of polyolefins, materials having low molecular weights (number average molecular weight, $M_n$, <20,000), systems that require protection/deprotection steps of the nitrile functionality to mitigate catalyst deactivation, systems that place the polar comonomer groups predominantly at chain ends, or systems that provide very low catalyst productivities.

Polyolefins, particularly polyethylene, are commonly modified by the incorporation of $C_3$ or higher alpha-olefin monomers such as 1-butene, 1-hexene, 1-octene, or 1-decene. These comonomers introduce alkyl branch points along the otherwise linear (and/or stereoregular) polymer main chain, reducing crystallinity and improving properties such as toughness and flexibility through the influence of the alkyl side chain groups residing in the amorphous region. The ethylene/α-olefin copolymers known as Linear Low Density Polyethylenes (LLDPEs) are particularly attractive examples of such materials. When sufficient amounts of α-olefin comonomer are introduced to polyolefins, the level of crystallinity of the resultant copolymers may become so low as to enable the production of useful elastomer or plastomer materials. For such reasons, copolymers of ethylene and nitrile-functionalized α-olefin comonomers, especially ω-nitrile-functionalized α-olefin comonomers (which most closely replicate the structures of linear α-olefin comonomers), are of particular desirability. In these materials, the fluid-resistant functional group and the flexible alkyl chain are introduced simultaneously in one desirable structural unit.

Tandem ring opening metathesis polymerization (ROMP)/hydrogenation techniques have been widely used as an alternate route into functional polyethylene and polyalkenamer structures. To date, these techniques have almost exclusively focused on the synthesis of polymers having functional substituents attached directly to the main chain (constitutionally equivalent to polyolefins produced by the copolymerization of ethylene with a second olefinic monomer having a polar functionality attached directly to one of the polymerizing olefinic carbons). Moreover, these techniques have produced mixed results, with some lower-functionality-tolerant catalysts failing to catalyze polymerization in the presence of the nitrile group. Thus the ROMP of (Z)-cyclooct-4-enecarbonitrile, a functional cyclooolefin monomer that would produce a polymer structure analogous to polyethylene-co-acrylonitrile after tandem ROMP/hydrogenation, was observed to fail when the metathesis catalyst $(PCy_3)_2Cl_2Ru{=}CHCH{=}CPh_2$ was used for polymerization (Hillmyer et al. *Macromolecules* 1995, 28, 6311-6316), but was successfully polymerized with other Ru-based catalysts (PCT International Patent Application WO03/062253A1). The ROMP of nitrile-bearing bicyclo[2.2.1]hept-5-ene-based monomers having one or more methylene spacers between the monomer ring structure and the nitrile functionality has been performed using Ru- and W-based catalysts (for example, see U.S. Pat. Nos. 3,991,139, 3,856,758, and 4,105,608 and WO03/062253A1), in addition to the more common ROMP of the analogous compound with no methylene spacer (5-norbornene-2-carbonitrile). The polymeric ROMP products obtained from the bicyclo[2.2.1]hept-5-ene-based (norbornene-based) monomers, unlike those obtained from monocyclic olefin monomers such as functionalized cyclooctenes, contain intact cyclopentene rings in their backbones.

It has now been found that ROMP of monocyclic olefins having distally pendant polar moieties, especially ω-nitrile-functionalized alkyl substituents, can be used to prepare functionalized polyalkenamers with structures analogous to terpolymers of ethylene, 1,4-enchained butadiene, and an ω-nitrile-functionalized α-olefin. Hydrogenation of these functionalized polyalkenamers produces materials equivalent to copolymers of ethylene and ω-nitrile-functionalized α-olefins. These materials exhibit improved oil swell resistance as compared to unfunctionalized EPDM copolymers, plus superior thermal stability and low-temperature properties (lower glass transition temperature, $T_g$) as compared to commercial nitrile rubbers. The materials therefore have potential utility in, for example, the production of gaskets and hoses for automobile applications.

The tandem sequential ROMP/hydrogenation of bi- or multicyclic olefin monomers bearing nitrile substituents directly attached to the ring structure is known (for example, see Jpn. Kokai Tokkyo Koho 63317520A and 60049051A). Unlike the ROMP/hydrogenation of nitrile-substituted monocyclic olefins, these techniques produce materials with intact cycloalkane rings in the polymer backbones, rather than materials analogous to the desired ethylene/nitrile-substituted-α-olefin copolymers. Such materials also bear nitrile substituents that are not separated from the atoms in the polymer main chain by desirable, flexible alkyl groups. For example, Yoshida, Y. et al. *J. Appl. Polym. Sci.* 1997, 66, 367-375 and references therein and U.S. Pat. No. 6,197,894 disclose the ROMP of nitrile-substituted multicyclic monomers such as 8-cyanotetracyclo[$4.4.0.1^{3,5}.1^{7,10}$]-3-dodecene, and the subsequent hydrogenation of the resultant nitrile-functionalized polyalkenamers. The $T_g$s of the hydrogenated materials, as typical of materials containing backbone rings, were high (>135° C.) and suitable for structural rather than elastomeric purposes.

U.S. Patent Application Publication No. 2005/0137369, published Jun. 23, 2005 and the entire contents of which are incorporated herein by reference, discloses a linear functional polymer comprising randomly repeating units A, B and D, wherein A represents —$CH_2$—; B represents —$CH(R_1)$, wherein $R_1$ represents a polar functional group; and D represents —C(═O)—, wherein there are at least four A units separating each B unit, each D unit, and each B and D unit, and further wherein when the total number of B units, y, is an integer greater than or equal to 1; and the total number of D units, h, is an integer greater than or equal to 0, then the total number of A units, x, is an integer sufficient that the molar fraction of the B and D units in the polymer is represented by a value j defined by the equation $j=(y+h)/(x+y+h)\leqq 0.032$. Thus, the polymer product contains low levels of the polar functional group. The polymer is produced by copolymerizing a first polar substituted monomer, such as cyclooct-4-en-1-ol, with a second non-polar unsubstituted monomer, such as cyclooctene, and is a semicrystalline rather than an elastomeric material.

SUMMARY

In one aspect, the invention resides in a process for producing a functionalized polyalkenamer, the process comprising contacting at least one monomer comprising a monocyclic olefin having at least one pendant alkyl group bonded thereto, said pendant alkyl group having at least two carbon atoms and being substituted with a polar moiety spaced by at least one carbon atom from said monocyclic olefin, with a polymerization catalyst under conditions effective to effect ring opening polymerization of said monocyclic olefin and produce said functionalized polyalkenamer.

Conveniently, said monocyclic olefin has at least five carbon atoms. In one embodiment, said monocyclic olefin comprises a substituted cyclooctene.

Conveniently, said polar moiety is in the ω-position relative to said cyclic olefin along the pendant alkyl group.

Conveniently, said polar moiety is selected from —CN, —$CO_2$R, —C(═O)R, and —S(═O)Ph, where R is an alkyl group having from one to ten carbon atoms or an aryl group having from six to fourteen carbon atoms and Ph is phenyl.

In one embodiment, said monomer comprises (Z)-3-(cyclooct-4-enyl)-propanenitrile.

Conveniently, said monomer is contacted with said polymerization catalyst in the presence of at least one comonomer, such as an unsubstituted monocyclic olefin, for example cyclooctene and/or cyclooctadiene.

Conveniently, said polymerization catalyst comprises a compound of the formula:

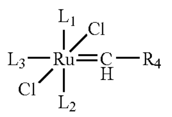

wherein $L_1$ and $L_2$ are independently selected from the group consisting of alkyl phosphine, aryl phosphine, 1,3-dimesityl-imidazol-2-ylidene, 1,3-di(2,6-diisopropyl-phenylimidazol-2-ylidene, 1,3-diarylimidazol-2-ylidene, 1,3-dimesitylimidazolidin-2-ylidene, 1,3-di(2,6-diisopropylphenyl) imidazolidin-2-ylidene, 1,3-diarylimidazolidin-2-ylidene, 1,3-diphenyltriazine, and pyridine or a halosubstituted pyridine; $L_3$, if present, is pyridine or a halosubtituted pyridine and is identical to $L_2$; and $R_4$ is selected from the group consisting of hydrogen, $C_1$-$C_{20}$ linear alkyl, $C_1$-$C_{20}$ branched alkyl, $C_1$-$C_{20}$ cycloalkyl, $C_1$-$C_{20}$ alkenyl, aryl and phenyl.

Conveniently, the process further comprises hydrogenating said functionalized polyalkenamer, such as in the presence of a rhodium-based catalyst.

In a further aspect, the invention resides in a functionalized polyalkenamer comprising repeating units of ethylene, butadiene, and a polar group-substituted α-olefin termonomer, said α-olefin termonomer having at least four carbons and having its polar group spaced by at least one carbon from the polymerizing olefin unit.

In yet a further aspect, the invention resides in a functionalized polymer produced by hydrogenating the functionalized polyalkenamer of said further aspect and comprising repeating units of ethylene and a polar group-substituted α-olefin termonomer, said α-olefin termonomer having at least four carbons and having its polar moiety spaced by at least one carbon from the polymerizing olefin unit.

In another aspect, the invention resides in (Z)-3-(cyclooct-4-enyl)-propanenitrile and to a method of its synthesis.

In still another aspect, the invention resides in a functionalized polyalkenamer comprising repeating units of ethylene, butadiene, and 4-pentenenitrile, and the hydrogenated product of said functionalized polyalkenamer comprising repeating units of ethylene and 4-pentenenitrile.

BRIEF DESCRIPTION OF THE DRAWINGS

The drawing is a graph of solubility parameter against hydrogen-bonding capacity in different solvents for the hydrogenated poly(ethylene-co-4-pentenenitrile) of Example 6 and for various commercial elastomers.

DETAILED DESCRIPTION

As used herein, the term "polyalkenamer" means a polyalkene having olefinic unsaturation in the main chain of the polymer, whereas the term "functionalized polyalkenamer" means a polyalkene having olefinic unsaturation in the main chain of the polymer and pendant functional groups extending from the polymer chain.

As used herein, the term "monocyclic olefin" means an unsaturated compound having a molecular structure including a single closed ring and one or more carbon-carbon double bonds forming part of the ring.

For purposes of this invention and the claims thereto when a polymer is referred to as comprising an olefin monomer, such as ethylene, it will be appreciated that the olefin monomer present in the polymer is the polymerized form of the olefin monomer. Likewise the use of the term polymer is meant to encompass homopolymers and copolymers. In addition the term copolymer includes any polymer having 2 or more monomers.

Described herein is a process for producing a functionalized polyalkenamer, in which a monocyclic olefin monomer having one or more pendant polar moieties is contacted with a polymerization catalyst under conditions effective to effect ring opening polymerization of the monomer and produce the functionalized polyalkenamer. Since the product of the ring opening polymerization is unsaturated, the process optionally also comprises hydrogenation of the functionalized polyalkenamer to produce the final functionalized polymer product.

The cyclic monomer employed in the present process comprises a substituted monocyclic olefin, which typically has at least five ring carbon atoms, such as from five to 12 ring carbon atoms. Examples of suitable monocyclic olefins include cyclopentene and cyclooctene. Typically, the monocyclic olefin comprises cyclooctene. In addition, the monomer comprises at least one pendant, substituted alkyl group bonded to the olefinic ring or rings, wherein the pendant alkyl group has at least 2 carbon atoms and is substituted with a polar moiety spaced by at least one carbon atom from the cyclic olefin ring(s). The polar moiety is generally selected from —CN, $—CO_2R$, —C(═O)R, and —S(═O)Ph, where R is an alkyl group having from one to ten carbon atoms or an aryl group having from six to fourteen carbon atoms, although other electron-withdrawing groups can also be used. Typically the polar moiety is a nitrile group.

The polymerization is conveniently conducted in the presence of a catalyst comprising a compound of the formula (I):

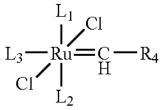

wherein $L_1$ and $L_2$ are independently selected from the group consisting of alkyl phosphine, aryl phosphine, 1,3-dimesityl-imidazol-2-ylidene, 1,3-di(2,6-diisopropyl-phenyl)imidazol-2-ylidene, 1,3-diarylimidazol-2-ylidene, 1,3-dimesityl-imidazolidin-2-ylidene, 1,3-di(2,6-diisopropylphenyl) imidazolidin-2-ylidene, 1,3-diarylimidazolidin-2-ylidene, 1,3-diphenyltriazine, and pyridine or a halosubstituted pyridine; $L_3$, if present, is pyridine or a halosubtituted pyridine and is identical to $L_2$; and $R_4$ is selected from the group consisting of hydrogen, $C_1$-$C_{20}$ linear alkyl, $C_1$-$C_{20}$ branched alkyl, $C_1$-$C_{20}$ cycloalkyl, $C_1$-$C_{20}$ alkenyl, aryl and phenyl. An example of a suitable catalyst within the definition of the formula (I) is benzylidene[1,3-dimesitylimidazolidin-2-ylidene](tricyclohexylphosphine) Ru(IV) dichloride, $RuCl_2(PCy_3)$(SIMes)CHPh, which is supplied by Strem or can be synthesized according to Tmka, T. M. et al. *J. Am. Chem. Soc.* 2003, 125, 2546-2558.

Other known classes of conventional (multicomponent) and discrete (ligated metal alkylidene) metathesis catalysts, which are not poisoned by the functional groups present on the monocyclic olefin monomer, may also be used in the present ring-opening polymerization process. These include, for example, 2,6-diisopropylphenyl-imidoneophylidenemolybdenum (VI) bis(hexafluoro-t-butoxide), 2,6-diisopropylphenylimidoneophylidenemolybdenum (VI) bis(t-butoxide), and similar molybdenum-based catalysts; conventional (multicomponent) tungsten chloride-based catalysts; and other discrete five- or six-coordinate ruthenium chloride-based alkylidene catalysts.

The polymerization can be conducted either neat (with the catalyst and monomer(s) alone) or in a solvent, such as dichlorobenzene, toluene, dichloromethane, tetrahydrofuran and/or mixtures thereof. To avoid secondary olefin isomerization/-cross-metathesis reactions during polymerization with certain polymerization catalysts, suitable temperatures such as from about 0° C. to about 44° C., and such as from about 10° C. to about 25° C., may be employed, optionally in conjunction with quenching of the polymerization immediately after quantitative monomer conversion is achieved.

Although the polymerization step can be conducted in the presence of the substituted monocyclic olefin alone, it is also possible to copolymerize the substituted monocyclic olefin with at least one comonomer, such as an unsubstituted cycloolefin, for example cyclooctene and/or cyclooctadiene. In this case, the unsubstituted cycloolefin is conveniently present in the monomer mixture in a molar amount that results in a polymeric product, after ROMP/hydrogenation, with a composition analogous to an ethylene/functional α-olefin copolymer containing from 10 to 40 mol % of the functional α-olefin comonomer.

The product of the polymerization step is a functionalized polyalkenamer comprising repeating units of ethylene, butadiene, and a polar group-substituted α-olefin termonomer, said α-olefin termonomer having at least four carbons and having its polar group spaced by at least one carbon from the polymerizing olefin unit. Since the polymerization product has olefinic unsaturation, it may be desirable to subject the product to hydrogenation to remove or reduce the olefinic unsaturation prior to use of the product as a functionalized elastomer. The product of the hydrogenation step is a functionalized polymer analogous to an ethylene/functional α-olefin copolymer and, in particular, an ethylene/functional α-olefin copolymer containing from 10 mol % to 40 mol % of the functional α-olefin comonomer.

Hydrogenation is conveniently conducted by contacting the polyalkenamer with a hydrogen-containing gas in the presence of a catalyst at a temperature of about 20° C. to about 180° C. for a time of about 0.5 hours to about 120 hours. Suitable catalysts include any conventional hydrogenation catalyst or stoichiometric reagent that will not react with, or be poisoned by, the functional group, such as the ruthenium-based metathesis catalysts themselves (for example, see Watson, M. D.; Wagener, K. B. *Macromolecules* 2000, 33, 5411-5417), or tris(triphenylphosphine)rhodium chloride and similar rhodium complexes.

In one practical embodiment, the cyclic monomer employed in the present process is (Z)-3-(cyclooct-4-enyl) propanenitrile, which has the following formula:

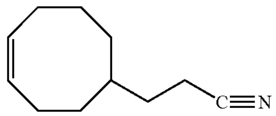

(Z)-3-(cyclooct-4-enyl)propanenitrile is believed to be a novel material in that no CAS number has been located. The material can readily be synthesized by reacting a 5-halo-1-cyclooctene, conveniently 5-bromo-1-cyclooctene, with acrylonitrile in the presence of a trialkyltin hydride, such as tributyltin hydride, and either a free-radical initiator, such as 2,2'-azobisisobutyronitrile, or a photoinitiation source, such as ultraviolet or visible light of the appropriate wavelength, following the general procedure (for halogenated substrates) described by Ohno, M.; Ishizaki, K.; Eguchi, S. *J. Org. Chem.* 1988, 53, 1285-1288; Giese, B. *Angew. Chem. Int. Ed. Engl.* 1985, 24, 553-565; and Giese, B. *Angew. Chem. Int. Ed. Engl.* 1983, 22, 753-764.

The homopolymerization and optional hydrogenation then give the products outlined in Scheme 1 below:

Scheme 1

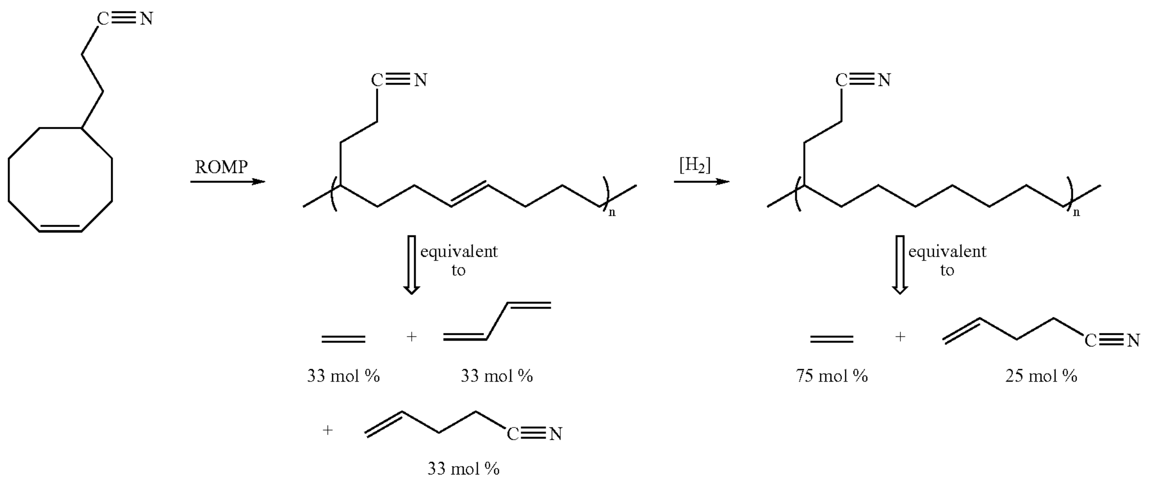

Thus the product of the ring opening polymerization of (Z)-3-(cyclooct-4-enyl)propanenitrile is a functionalized polyalkenamer comprising repeating units of ethylene, 1,4-enchained butadiene, and 4-pentenenitrile.

In Scheme 1, it is to be appreciated that the sidechain ($-CH_2CH_2CN$) units are depicted as being separated by 7 chain carbons (head-tail monomer connectivity of the (Z)-3-(cyclooct-4-enyl)propanenitrile monomer units); however, run lengths of 6 and 8 chain carbons arising from other regio-additions (head-head, 6 carbons; tail-tail, 8 carbons) are also present. It is also to be appreciated that, since the nitrile-bearing side chains in the products of Scheme 1 are separated only by short ethylene run lengths (6, 7, or 8 carbons), no long, crystallizable polyethylene segments are present, resulting in a desirable (for elastomer purposes) completely amorphous structure (these microstructural features can be modified by using a functionalized monocyclic olefin monomer with a different ring size, and/or by copolymerizing the functionalized monocyclic olefin monomer with an unfunctionalized monocyclic olefin monomer). In addition, the intermediate metathesis polyalkenamer obtained prior to hydrogenation is also of interest for elastomer applications, due to its structural similarity to unsaturated nitrile rubber (NBR).

The functional polyalkenamer and hydrogenated functional polyalkenamer products of the polymerization of (Z)-3-(cyclooct-4-enyl)propanenitrile typically have glass transition temperature ($T_g$) midpoints within the range of from about −65° C. to about −20° C. and decomposition onset temperatures of at least 370° C. The hydrogenated functional polyalkenamer products typically exhibit oil swell values within the known ranges of commercial oil-resistant elastomers, such as chloroprene and commercial NBR (using a modified version of the ASTM D471 test). The products therefore have utility as elastomers where heat and oil resistance are critical, such as in gaskets and hoses for automobile applications.

The invention will now be more particularly described with reference to the following non-limiting Examples.

EXAMPLES

In the Examples, NMR spectra were obtained in 5 mm tubes using a Bruker Avance 400 Ultrashield spectrometer or a Varian Unity Plus 500 MHz spectrometer, and are referenced to $CDCl_3$ ($^1H$, 7.25 ppm; $^{13}C$, 77.00 ppm), 1,1,2,2-tetrachloroethane-$d_2$ ($d_2$-TCE) ($^1H$, 5.93 ppm; $^{13}C$, 74.50 ppm), or $Me_4Si$ (0.00 ppm). Residual olefin contents of hydrogenated poly((Z)-3-(cyclooct-4-enyl)propanenitrile)s were calculated by measuring the $^1H$ NMR olefin resonances (5.6-5.2 ppm, 2 H), correcting the aliphatic integral (3.0-0.7 ppm) for unsaturated (Z)-3-(cyclooct-4-enyl)propanenitrile units (15 H), and assigning the remainder to saturated (Z)-3-(cyclooct-4-enyl)propanenitrile units (19 H). Infrared (IR) films were cast by pressing ca. 20 mg of polymer in a hot press at 140° C. for 1 minute. DSC analysis was carried out on a TA Instruments 2920 calorimeter using a scan rate of 10° C./minute from −130° C. to 150° C. Thermal transition values reported are from the second heat. IR spectra were obtained on a ThermoNicolet Nexus 470 FTIR running OMNIC software. Thermogravimetric analysis (TGA) was conducted in air on a TA Instruments AutoTGA 2950HR instrument using a scan rate of 10° C./minute from 25-600° C. Both DSC and TGA instruments utilized TA Instruments Universal Analysis software. Elemental analyses were carried out by QTI, Whitehouse, N.J. Polymer molecular weights reported versus polyethylene (PE) were measured using a Waters Associates 150° C. high temperature gel permeation chromatograph (GPC) equipped with three Polymer Laboratories mixed bed Type B columns and an internal differential refractive index (DRI) detector. The mobile phase was BHT-inhibited 1,2,4-trichlorobenzene (135° C., flow rate 1.0 mL/minute, typical sample concentration 2 mg/mL). Polymer molecular weights reported versus polystyrene (PS) were measured using a Waters Associates GPC equipped with three Polymer Laboratories mixed bed Type D columns, an internal DRI detector, and Peak Pro software. The mobile phase was uninhibited tetrahydrofuran (THF) (30° C., flow rate 1.0 mL/minute, typical sample concentration 2.5 mg/mL; sulfur added as a flow marker).

Example 1

Synthesis of (Z)-3-(cyclooct-4-enyl)propanenitrile

This material was prepared by the $Bu_3SnH$-/2,2'-azobisisobutyronitrile-(AIBN-) mediated reaction of 5-bromo-1-cyclooctene with acrylonitrile.

Repeated attempts at purification by distillation (94-95° C./1.3 mm Hg) produced two fractions of the material as a clear odorous liquid, 8.1 g (82.0% purity by GC) and 1.49 g (85.0%). The balance of the material, as assayed by GC/MS, consisted of $Bu_3SnBr$ (largest impurity, ~3.6 wt %). Other impurities included $Bu_4Sn$, hexanedinitrile, $C_{11}H_{16}$ isomers, cyanoethyl[3.3.0]cyclooctane ((octahydropentalen-3a-yl) propanenitrile), hexadecane (unconfirmed), and possibly bicyclo[3.3.0]octene. A third separately prepared batch of material (50 g) was free of butyl-containing impurities by $^1H$ NMR and was noted to be free of Sn-containing impurities, but still showed a complex GC/MS spectrum. $^1H$ NMR ($CDCl_3$, 400 MHz, 25° C.): δ 5.63 (m, CH═CH), 2.32, 2.14, 1.57, 1.42, 1.19 (all br m, $CH_2$ and CH) ppm. $^{13}C$ NMR ($CDCl_3$, 100 MHz, 25° C., assigned by DEPT): δ 129.90, 129.72 (CH═CH), 119.82 (CN), 36.34 (CH), 34.55, 33.84, 32.07, 27.73, 25.75, 24.62 ($CH_2$), 14.84 ($CH_2CN$) ppm. IR (crude material, neat on NaCl): 3012 (m), 2922 (vs), 2852 (s), 2682 (w), 2240 (s, $\upsilon_{CN}$), 1685 (w), 1647 (w), 1464 (s), 1449 (s), 1421 (sh), 1345 (m), 1252 (w), 1129 (w), 988 (w), 965 (w), 899 (sh), 880 (m), 744 (m), 720 (s) $cm^{-1}$. $n_{(20/D)}$ 1.49. Molecular weight of $C_{11}H_{17}N$: 163.26 g/mol.

Example 2

ROMP polymerization of (Z)-3-(cyclooct-4-enyl)propanenitrile

In the dry box, 2.2 mg (0.0026 mmol) benzylidene[1,3-dimesitylimidazolidin-2-ylidene](tricyclohexylphosphine) Ru(IV) dichloride, $RuCl_2(PCy_3)(SIMes)CHPh$, was added to a 50 mL round bottom flask equipped with a stirbar. The flask was sealed with a septum, removed from the drybox, and placed under a $N_2$ atmosphere. (Z)-3-(Cyclooct-4-enyl)propanenitrile (540 mg of 82% purity fraction, 3.30 mmol) was dissolved in 3 mL o-dichlorobenzene (ODCB, degassed by freeze-pump-thaw cycles and stored over 3 Å molecular sieves in a dry box) in a separate flask under atmospheric conditions and transferred onto the catalyst under $N_2$. The stirred polymerization was maintained under $N_2$ for 3 hours at 60° C. An increase in viscosity and a color change from purple-brown to yellow was observed. The polymer solution was cooled to room temperature and opened to air. Ethyl vinyl ether (4 drops) were added and the polymerization was stirred for 10 minutes. An excess of acidified methanol (0.5% v/v aq. HCl) was added to precipitate the polymer, which was rinsed with neat methanol, collected by filtration, and dried in a vacuum oven at room temperature for 60 hours (0.363 g, 82%; brown sticky rubber). GPC (DRI, 1,2,4-trichlorobenzene, 135° C., vs. polyethylene): $M_p$ (peak of molecular weight distribution ~27,000; material not fully soluble for analysis.

Example 3

ROMP polymerization of purified (Z)-3-(cyclooct-4-enyl)propane-nitrile

A 1.0 g portion of the 82% purity fraction of (Z)-3-(cyclooct-4-enyl)propanenitrile (Example 1) was eluted through a silica column using 9:1 hexanes:ethyl acetate to give 0.9 g of a slightly purer material, which was diluted with 3 mL toluene in a syringe. This solution was passed through a Waters silica gel Sep-Pak (catalog no. WAT051900) followed by elution with an equal volume (3 mL) of $CH_2Cl_2$ and removal of volatiles from the combined eluents to give 0.841 g of a material free from $Bu_3SnBr$ according to GC analysis. This material (5.14 mmol assuming 82% purity) was placed under $N_2$ in a 50 mL round bottom flask equipped with a stirbar. In the drybox, 3.5 mg (0.0041 mmol) $RuCl_2(PCy_3)(SIMes)$ CHPh was weighed into a vial, dissolved in 3 mL dry ODCB, and transferred to a syringe. An additional 2 mL dry ODCB was charged into a vial which was sealed with a rubber septum. The syringe and vial were removed from the dry box and the catalyst solution was added to the monomer. The syringe was rinsed with the additional 2 mL dry ODCB, which was also added to the polymerization solution. The stirred polymerization was maintained under $N_2$ for 4 hours at 60° C., cooled to 0° C., opened to air, quenched with 5 mL each of pyridine and ethyl vinyl ether, and stirred for 10 minutes. It was then diluted with 100 mL ODCB and warmed to 60° C. Neutral chromatographic grade alumina (0.5 g) was added, and the hot solution was filtered through a 5μ Teflon™ filter. The solution was concentrated to ca. 75 mL and an excess of acidified methanol was added to precipitate the polymer, which still retained some brown color. An attempt to remove the color by reprecipitation from hot xylenes into methanol was unsuccessful due to incomplete solubility in xylenes. The polymer was recollected and dried (293 mg, 43%), dissolved in 5 mL 1,1,2,2-tetrachloroethane (TCE) at 135° C., and treated with an additional 0.5 g alumina. The hot polymer solution was filtered and depleted of TCE in vacuo. The resultant still-brownish rubber was rinsed with methanol and dried (241 mg, 35%). GPC (DRI, 1,2,4-trichlorobenzene, 135° C., vs. polyethylene): $M_w$ 44,280; $M_n$ 20,970.

Example 4

Multigram ROMP polymerization of purified (Z)-3-(cyclooct-4-enyl)-propanenitrile The remainder of the 82% purity fraction of (Z)-3-(cyclooct-4-enyl)propanenitrile (not used in Examples 2 and 3) was combined with the 85% purity fraction, diluted with an equal volume of toluene, and treated via the Sep-Pak procedure described in Example 3 to give 4.564 g of monomer (22.9 mmol assuming 82% purity). This material was placed in a 100 mL 24/40 round bottom flask containing a stirbar and placed under $N_2$. In the dry box, 19 mg (0.0224 mmol) $RuCl_2(PCy_3)(SIMes)CHPh$ was dissolved in ca. 10 mL dry ODCB and charged into a syringe. An additional 18 mL ODCB was charged into a vial which was sealed with a rubber septum. Both items were removed from the dry box. After addition of the catalyst solution to the monomer, the syringe was rinsed with the additional 18 mL ODCB, which was also added to the monomer. The stirred polymerization was maintained under $N_2$ for 4.5 hours at 60° C. The polymer solution was cooled using an ice bath, opened to air, quenched with pyridine and ethyl vinyl ether (1 mL each), stirred for 10 minutes, and depleted of volatiles under vacuum. The solution was warmed to 60° C., diluted with an additional 150 mL of ODCB, and treated with neutral chromatographic grade alumina (0.5 g) as described in Example 3. The solution was concentrated to ca. 100 mL under vacuum and a large excess of methanol was added, giving a cloudy mixture containing fine white polymer particles. The methanol was removed using a rotary evaporator and the polymer solution was further concentrated to ca. 75 mL by trap-to-trap ODCB distillation under vacuum at 90° C. An excess of aqueous methanol (10% $H_2O$ by volume) was added to precipitate the polymer as a sticky, brownish rubber, which was collected by decantation and dried overnight under vacuum at room temperature (2.2 g, 59% assuming 82% monomer purity; theo. yield 3.742 g). Filtration of the supernatant (a whitish emulsion) did not give additional material and the filtrates were set aside for later workup. The crude polymer retained an ODCB odor and was dissolved in ca. 200 mL tetrahydrofuran (THF). After filtration through a 5-10 μm Teflon™ filter to remove gels, a large excess of hexanes was added to precipitate the polymer as slightly brown sticky rubber with no residual odor (1.77 g, 47%). The polymer was collected by cooling the precipitation mixture to −15° C. in a freezer, decanting the supernatant, and scraping the cold polymer from the sides of the flask. The precipitation supernatants were saved, combined with the previous precipitation filtrates, and depleted of volatiles on a rotary evaporator giving a brown ODCB solution containing residual polymer. The solution was concentrated to ca. 10 mL at 70° C. using a rotary evaporator connected to a direct-drive high vacuum pump, and an excess of methanol was added to precipitate residual polymer, which was collected by filtration and dried under vacuum at room temperature overnight to give 0.57 g (15%) of a smelly, brownish-red rubber. $^1$H NMR ($d_2$-TCE, 499 MHz, 120° C.): δ 5.42 (d, J=2.5 Hz, trans CH═CH) and 5.37 (d, J=3.0 Hz, cis CH═CH) (total 2 H), 2.28 (tr, J=7.2 Hz, 2 H, $CH_2$CN), 1.99 (br, 4 H, ═$CHCH_2$), 1.62 (q, J=7.0 Hz, 2 H, $CH_2CH_2$CN), 1.48 (tr, J=6.0 Hz, 1H, CH), 1.45-1.25 (appears as overlapped q (1.36, J=7.3) and tr (1.31, J=7.0), 6 H, $CH_2$) ppm. $^{13}$C NMR ($d_2$-TCE, 125 MHz, 120° C.): δ 130.75 (trans CH═CH), 130.18 (cis CH═CH) (total 2 C), 120.08 (CN, 1 C), 37.03 (CH, 1 C), 33.70, 33.08, 32.99, 30.05, 29.96, 27.88 (minor, cis allylic $CH_2$), 26.92 ($CH_2$, each 1 C), 24.92 (minor, cis allylic $CH_2$), 15.14 ($CH_2$CN, 1 C) ppm. Cis:trans ratio 78:22 (avg. $^1$H/$^{13}$C). IR (pressed film on NaCl): 3050-3000 (w sh), 2922 (vs), 2852 (s), 2240 (m, $\upsilon_{CN}$), 1666 (w, $\upsilon_{C═C}$), 1454 (m), 1421 (sh), 1355 (w), 1313 (w), 1078 (w), 969 (s), 744 (w) $cm^{-1}$. DSC: $T_g$ onset −49.8° C.; midpoint −48.1° C. GPC (DRI, trichlorobenzene, 135° C., vs. PE): $M_w$ 53,060, $M_n$ 26,180; small oligomeric tail of $M_n$ 990. TGA (air): loss onset 428° C.; 10% loss, 430° C. Calculated for $C_{11}H_{17}N$: C, 80.93; H, 10.50; N, 8.58. Found: C, 80.53; H, 10.55; N, 8.47. Solubility of pure, solvent-free material: soluble in tetrachloroethane (100° C.); partially soluble in hot ODCB; exhibited swelling but incomplete solubility in acetone, THF, and $CHCl_3$; insoluble in hexanes and acetonitrile.

Example 5

Small-scale hydrogenation of poly((Z)-3-(cyclooct-4-enyl)propane-nitrile)

A 200 mg sample of the polymer of Example 4 (1.23 mmol olefins) was dissolved in 7 mL anhydrous chlorobenzene in a 1 oz. glass jar (sized to fit closely inside a 100 mL Parr reactor) at 100° C. to give a slightly brown solution. A solution of 2 mg (2.2 μmol) $(PPh_3)_3RhCl$ in 2 mL anhydrous chlorobenzene was added. Subsequently, a solution of 20 mg (0.076 mmol) $PPh_3$ in 1 mL anhydrous chlorobenzene was added. The jar was placed inside a 100 mL Hastelloy C Parr reactor fitted with an internal stirring shaft, four-point paddle blade, and a thermocouple probe. The reactor was assembled, charged with 800 psig $H_2$ in batch mode, heated to 105° C. ($H_2$ pressure at temperature: 880 psig) and stirred at 200 RPM for 16 hours. The reactor was subsequently cooled, vented slowly, and opened. The contents of the jar (darker colored solution) were added to excess methanol to give a white emulsion with small polymer particles. The methanol and chlorobenzene were removed at 70° C. using a rotary evaporator attached to a direct-drive high vacuum pump. The residual polymer was redissolved in 4 mL chlorobenzene at 70° C. and precipitated into excess methanol. The blackish rubber was collected by filtration and dried in vacuo at room temperature (179 g, 88%, theoretical yield 203 mg; MW of hydrogenated repeat unit 165.28 g/mol). Subsequently, the material was reprecipitated from TCE into hexanes and dried under high vacuum with slight heating to give a dark brown rubber (167 mg, 82%). Residual olefin content was ≦0.86 mol % by $^1$H NMR. $^1$H NMR ($d_2$-TCE, 400 MHz, 25° C.): δ 2.25 (br, 2 H, $CH_2$CN, appears as tr at 500 MHz), 1.54 (br, 2 H, $CH_2CH_2$CN, appears as br d at 500 MHz), 1.35 (1 H, CH), 1.18 (br s, 14 H, $CH_2$) ppm. $^{13}$C NMR ($d_2$-TCE, 100 MHz, 25° C.): δ 121.21 (1 C, CN), 37.24 (1 C, CH), 33.42 (2 C, $CH_2$), 30.61 (2 C, $CH_2$), 30.28 (1 C, $CH_2$), 29.67 (1 C, $CH_2CH_2$CN), 29.02 (2 C, $CH_2$), 15.31 (1 C, $CH_2$CN) ppm. IR (pressed film on NaCl): 2922 (vs), 2852 (s), 2245 (m, $\upsilon_{CN}$), 1459 (m), 1421 (m), 1365 (w), 1318 (w), 795 (w), 744 (w), 715 (w) $cm^{-1}$. GPC (DRI, trichlorobenzene, 135° C., vs. PE): $M_w$ 18,750, $M_n$ 11,400; small oligomeric tail of $M_w$ 1,670, $M_n$ 1,110 (25% of distribution). DSC: $T_g$ onset −53.2° C.; midpoint −50.1° C.

Example 6

Scale-up hydrogenation of poly((Z)-3-(cyclooct-4-enyl)propanenitrile)

The remainder of the polymer material not used in Example 5 (1.287 g, 7.89 mmol olefins) was hydrogenated using a similar procedure to that described in Example 5 in a 300 mL Hastelloy Parr with a glass liner. The amounts of reagents used were 12.9 mg (13.9 μmol) $(PPh_3)_3RhCl$, 129 mg (0.49 mmol) $PPh_3$, and 64 mL total anhydrous chlorobenzene ($H_2$ pressure at temperature: 810 psig). During reprecipitation from TCE into hexanes, the polymer TCE solution was filtered to remove black coagulated catalyst particles; cooling of the hexane-precipitated product in a freezer to −15° C. assisted in scraping product from the walls of the precipitation flask. A very elastic tan rubber was isolated after drying at 40° C. (1.163 g, 89%, theoretical yield 1.304 g). The residual olefin content was 0.27 mol % by $^1$H NMR. GPC (DRI, trichlorobenzene, 135° C., vs. PE): $M_w$ 50,920, $M_n$ 26,560; small oligomeric tail of $M_n$ 1,710. DSC: $T_g$ onset −50.3° C.; midpoint −48.3° C. TGA (air): loss onset 423° C.; 10% loss, 420° C. Calculated for $C_{11}H_{19}N$: C, 79.94; H, 11.59; N, 8.47. Found: C, 78.22; H, 11.12; N, 8.25.

Example 7

Repeat ROMP polymerization of purified (z)-3-(cyclooct-4-enyl)-propanenitrile A 15 g portion of the third, 50 g batch of (Z)-3-(cyclooct-4-enyl)propanenitrile monomer (Example 1) was dissolved in 45 mL toluene and passed in parallel through 5 Sep-Paks as described in Example 3 (9 mL solution per Sep-Pak). Each Sep-Pak was then rinsed with 9 mL $CH_2Cl_2$. The combined eluents were depleted of volatiles under high vacuum. In the drybox, 2.2 mg (2.6 μmol) $RuCl_2(PCy_3)$(SIMes)CHPh was placed in a 100 mL round bottom flask with a stirbar. The flask was sealed, removed from the drybox, and placed under $N_2$. Separately, a 0.540 g portion of the purified monomer (nominal 3.30 mmol, purity unknown) was diluted with 3 mL ODCB (degassed by freeze-pump-thaw cycles). This solution was transferred to the flask containing the catalyst under $N_2$ and the stirred polymerization was heated at 60° C. for 3 hours. After quench at 0° C. with pyridine and ethyl vinyl ether (2 drops each), an excess of methanol was added to precipitate the polymer, which was redissolved in TCE at room temperature, re-precipitated into methanol, collected by filtration, and dried overnight under high vacuum (397 mg; % yield not calculatable due to unknown monomer purity). GPC (DRI, THF, 30° C., vs. polystyrene): $M_w$ 85,920, $M_n$ 22,150; small oligomeric tail (11% of distribution); insoluble for high-temperature GPC-DRI analysis in trichlorobenzene.

Example 8

Repeat multigram ROMP polymerization of purified (Z)-3-(cyclooct-4-enyl)propanenitrile An 8.0 g portion of the purified (Z)-3-(cyclooct-4-enyl) propanenitrile monomer described in Example 7 (nominal 49 mmol, purity unknown) was diluted with 40 mL ODCB (sparged with $N_2$ and dried over molecular sieves) in a round bottom flask with a stirbar. A solution of 27.7 mg (32.6 μmol) $RuCl_2(PCy_3)$(SIMes)CHPh in 9 mL similarly prepared ODCB was charged into a syringe in the drybox, and added to the monomer via syringe under $N_2$. The polymerization was stirred at 60° C. for 4 hours and quenched with 1 mL each of pyridine and ethyl vinyl ether at 0° C. An excess of methanol was added to precipitate the polymer, which was reprecipitated from TCE at 25° C. into methanol and dried overnight under high vacuum (6.0 g; % yield not calculable due to unknown monomer purity). This material was then redissolved in 500 mL THF and filtered through a 5-10 μm Teflon™ filter. After concentration of the filtrate to ca. 100 mL, hexanes were added to precipitate the purified polymer, which was dried overnight under vacuum at 60° C. (5.2 g).

Example 9

Hydrogenation of poly((Z)-3-(cyclooct-4-enyl)propanenitrile)

The polymer product of Example 8 (5.2 g, 31.9 mmol olefins) was hydrogenated using a procedure similar to that described in Example 5 for 22 hours using 52.1 mg (56.3 μmol) $(PPh_3)_3RhCl$, 521.2 mg (1.99 mmol) $PPh_3$, and 160 mL total anhydrous chlorobenzene. Dissolution of the polymer was carried out at 70° C. After initial precipitation into methanol, the polymer was reprecipitated from 30 mL TCE at 25° C. into methanol and dried in vacuo overnight at 60° C. (5.0 g, 95%, theo. yield 5.272 g). This material still contained some $Ph_3P$ by $^1H$ NMR, and was redissolved in 500 mL THF, filtered through a Teflon™ filter, and precipitated into hexanes after concentration of the filtrate to 100 mL (light brown sponge, yield recorded as 4.2 g). Finally, the purified polymer was reprecipitated from TCE into hexanes and dried under vacuum to give a tan rubber (4.50 g, 85%). GPC (DRI, trichlorobenzene, 135° C., vs. PE): $M_w$ 30,320, $M_n$ 18,580; small oligomeric tail with $M_n$ 1,560. DSC: $T_g$ onset −57.0° C.; midpoint −53.8° C. No residual olefins were detected by $^1H$ NMR.

The polymerizations and hydrogenations in Examples 2-9 are summarized in Tables 1 and 2.

TABLE 1

Poly(Z)-3-(cyclooct-4-enyl)propanenitrile)s.

| Ex.[a] | Monomer[a] (g) | Catalyst (mg) | ODCB (mL) | T (° C.), T (h) | Yield[b] (g) | $M_w$, $M_n$[c] | GPC notes |
|---|---|---|---|---|---|---|---|
| 2 | 0.540[d] (3.30 mmol) | 2.2 (2.6 μmol) | 3 | 60, 3 | 0.363 (82%) | ~27,000 ($M_p$) | not fully soluble |
| 3 | 0.840[e] (5.14 mmol) | 3.5 (4.1 μmol) | 5.2 | 60, 4 | 0.293 (43%) | 44,280 20,970 | — |
| 4 | 4.564[f] (22.9 mmol) | 19 (22.4 μmol) | 28 | 60, 4.5 | 2.2[i] (59%) | 53,060 26,180 | low mol. wt. portion ($M_n$ 990) |
| 7 | 0.540[g] (3.30 mmol) | 2.2 (2.6 μmol) | 3 | 60, 3 | 0.397[j] | 85,920 22,150[l] | low mol. wt. portion (11%)[m] |
| 8 | 8.0[g] (49 mmol) | 27.7[h] (32.6 μmol) | 49 | 60, 4.5 | 6.0[j,k] | Not taken | — |

[a]Target conditions: nominal $[monomer]_o$ = 1.0 M; nominal monomer:catalyst = 1250:1 not correcting for <100% purity of monomer.

[b]Percent yield assumes an initial monomer purity of 82 wt %.

[c]GPC-DRI, trichlorobenzene, 135° C., vs. polyethylene standards; $M_p$ = peak of molecular weight distribution.

[d]Crude monomer as obtained after synthesis, with no purification (82% purity).

[e]82% purity monomer after elution through silica with 9:1 hexanes:ethyl acetate and passage through Sep-Pak cartridge filter.

[f]Combined 82-85% purity monomer batches after elution through silica with 9:1 hexanes:ethyl acetate and passage through Sep-Pak cartridge filter; assuming 82% purity.

[g]50 g batch of monomer free of Sn impurities (exact purity unknown), after passage through Sep-Pak cartridge filter.

[h]Target conditions: nominal monomer:catalyst 1500:1.

[i]Yield of purified material 1.77 g (47%); additional 0.57 g (15%) recovered from filtrate.

[j]Yield N/A since purity of monomer unknown.

[k]Yield of purified material 5.2 g.

[l]GPC-DRI, THF, 30° C., vs. polystyrene; insoluble for high-temperature analysis (insolubility may partially reflect extended delay prior to GPC run)

[m]11% of total molecular weight distribution.

TABLE 2

Hydrogenated poly(Z)-3-(cyclooct-4-enyl)propanenitrile)s.

| Ex.[a] | Amt. (g) | Yield (g) | Residual olefins (%)[b] | $M_w$, $M_n$[c] (start. mat'l)[d] | $T_g$ onset, midpt. (° C.)[e] | Molecular weight distribution notes |
|---|---|---|---|---|---|---|
| 5 | 0.2 | 0.179 (88%)[f] | <0.86 | 18,750; 11,400 (53,060; 26,180) | −53.2, −50.1 | low mol. wt. tail (25%)[i]; $M_w$ 1,670; $M_n$ 1,110 |
| 6 | 1.29 | 1.163 (89%)[g] | 0.27 | 50,920; 26,560 (53,060; 26,180) | −50.3, −48.3 | low mol. wt. tail $M_n$ 1,710 |
| 9 | 5.2 | 5.0 (95%)[h] | — | 30,320; 18,580 (N/A) | −57.0, −53.8 | low mol. wt. tail $M_n$ 1,560 |

[a]Conditions: 2 wt % polymer solution in chlorobenzene; olefin:$(Ph_3P)_3RhCl$ 560:1, $Ph_3P$:$(Ph_3P)_3RhCl$ 34.5:1, 105° C., 800 psig $H_2$, 16-22 h.
[b]By $^1H$ NMR.
[c]GPC-DRI, trichlorobenzene, 135° C., vs. polyethylene standards.
[d]Data for polyalkenamer prior to hydrogenation.
[e]DSC, 10° C./min, midpoint of 2nd heat.
[f]Yield of purified material 167 mg (82%); blackish product.
[g]Yield after purification.
[h]Yield of purified material 4.5 g (85%).
[i]25% of total molecular weight distribution.

Example 10

Comparison of ROMP-Derived Materials to Existing Elastomers: Tg and Thermal Stability The ROMP materials prepared in Examples 4 and 6 were subjected to a property comparison to existing elastomers, in particular to nitrile rubber (NBR, poly(butadiene-co-acrylonitrile)), and hydrogenated nitrile rubber (HNBR). Nitrile rubber contains both 1,4- and 1,2-enchained butadiene units and is structurally similar to the ROMP polyalkenamer precursor poly((Z)-3-(cyclooct-4-enyl)propanenitrile), which serves as the synthetic intermediate to poly(ethylene-co-4-pentenenitrile). Hydrogenated nitrile rubber is structurally analogous to a terpolymer of ethylene, 1-butene, and acrylonitrile (AN), see Scheme 2 below, and hence has structural similarities to the ROMP materials prepared herein and illustrated in Scheme 1 above.

Scheme 2

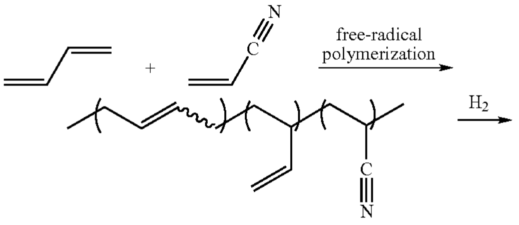

NBR

-continued

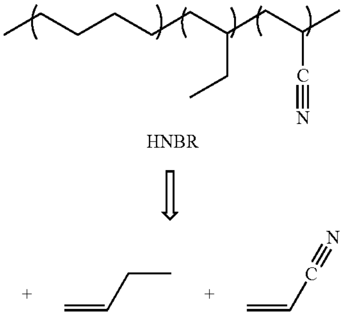

Property summaries for "ROMP NBR" (poly((Z)-3-(cyclooct-4-enyl)propanenitrile)) and "ROMP HNBR" (hydrogenated poly((Z)-3-(cyclooct-4-enyl)propanenitrile)=poly (ethylene-co-4-pentenenitrile)) are given in Table 3 along with data for commercial elastomers used as comparatives (Aldrich Chemical Co. NBR, Nippon Zeon Zetpol® HNBR). For comparative characterization purposes, the mol % of nitrile (CN) units on a polyethylene basis was adopted as a standard compositional characteristic. As shown in Table 3, the $T_g$s of the functionalized polyalkenamer and hydrogenated poly((Z)-3-(cyclooct-4-enyl)propanenitrile)s were below −48° C., indicating suitable low-temperature flexibility, and were lower than those for the commercial NBR and HNBR materials. The ROMP-derived materials also exhibited better thermal stability (TGA air decomposition onset>420° C.) than the commercial NBR and HNBR rubbers (<420° C.).

TABLE 3

| Material | Composition | Equiv. mol % CN units in PE[a] | $M_w$, $M_n$[b] | $T_g$ onset, midpt. (° C.)[c] | TGA dec. onset (° C.)[d] (5, 10 wt % loss) | 50° C. oil swell (wt %)[e] | Sol. par.[f] $(cal/cc)^{1/2}$ |
|---|---|---|---|---|---|---|---|
| Aldrich NBR[g] | 30-35 wt % AN | 17.9-21.5 | 58,560 23,540 | −30.2, −28.4 | 405 (365, 407) | 2.8 | |
| Aldrich NBR[h] | 19-22 wt % AN | 10.7-12.6 | 68,450 26,020[m] | −49.5, −45.4 | 417 (325, 411) | 45.4 | |
| "ROMP NBR"[i] | 25 mol % 4PN | 16.7 | 53,060 26,180 | −49.8, −48.1 | 428 (421, 430) | NA[o] | |
| Zetpol ® 2000 | 34.9-37.5 | 22.1-24.1 | 101,990 | −29.4, | 397 | 4.24 | 10.5 |

TABLE 3-continued

| Material | Composition | Equiv. mol % CN units in PE[a] | $M_w$, $M_n$[b] | $T_g$ onset, midpt. (° C.)[c] | TGA dec. onset (° C.)[d] (5, 10 wt % loss) | 50° C. oil swell (wt %)[e] | Sol. par.[f] (cal/cc)$^{1/2}$ |
|---|---|---|---|---|---|---|---|
| HNBR[j] | wt % AN | | 38,250 | −27.4 | (388, 400) | | |
| Zetpol ® 3310 | 22.1-25.1 | 13.0-15.1 | 166,120 | −39.8, | 374 | 14.1 | 9.5 |
| HNBR[k] | wt % AN | | 37,230[n] | −37.3 | (363, 377) | | |
| "ROMP | 25 | 16.7 | 50,920 | −50.3, | 423 | 49.8 | 9.5 |
| HNBR"[l] | mol % 4PN | | 26,560 | −48.3 | (409, 420) | | |
| Chloroprene Rubber | poly(2-chloro-1,3-butadiene) | | | | | 42.6 | 9.3 |
| Butadiene Rubber | Polybutadiene | | | | | NA[o] | 8.4 |
| ExxonMobil EPDM 1[p] | 60.0 wt % E, 11.0 wt % ENB, 29 wt % P | | high molecular weight; bimodal | | | 231.5 | |
| ExxonMobil EPDM 2[p] | 55.5 wt % E, 5.7 wt % ENB, 38.8 wt % P | | High molecular weight; bimodal | | | 172.1 | |

[a]CN units as % of total of CN, $C_2H_4$, and CH═CH units present (assuming complete olefin saturation in HNBR).
[b]GPC-DRI vs. PE, 135° C., 1,2,4-trichlorobenzene.
[c]DSC, 10° C./min, midpoint of 2nd heat.
[d]In air, 10° C./min, extrapolated.
[e]See Example 12.
[f]See Example 11.
[g]Tan sticky rubber, d 0.98, Mooney viscosity 42-52.
[h]Tan spongy rubber, d 0.98, Mooney viscosity 65-85.
[i]Poly((Z)-3-(cyclooct-4-enyl)propanenitrile) (unhydrogenated) of Example 4; sticky brownish rubber (4PN = 4-pentenenitrile).
[j]Black flap, nominal 36.2% acrylonitrile (34.9-37.5%), nominal iodine no. 4 (≧7.0), >99.5% saturated, d 0.95, nominal 100° C. Mooney viscosity 85 (78.0-92.0).
[k]Translucent brown rubbery chunk, nominal iodine no. 15 (10-20), >95% saturated, d 0.97, 100° C. Mooney viscosity 60-100. Composition does not account for proprietary termonomer; probably overestimated.
[l]Hydrogenated poly((Z)-3-(cyclooct-4-enyl)propanenitrile) of Example 6; elastic tan rubber (4PN = 4-pentenenitrile).
[m]Soluble portion; sample was a largely insoluble gel.
[n]Bimodal; sample only partially soluble.
[o]Not analyzed.
[p]EPDM = terpolymer of ethylene (E), propylene (P), and 5-ethylidene-2-norbornene (ENB).

Example 11

Comparison of ROMP-Derived Materials to Existing Elastomers: Solubility

Solubility parameters for the hydrogenated poly((Z)-3-(cyclooct-4-enyl)propanenitrile) "ROMP HNBR" prepared in Example 6 and comparative commercial elastomers were measured using a microscale-modified version of the ASTM D3132 test (Standard Test Method for Solubility Range of Resins and Polymers), validated with an initial benchmarking of 17 control polymers (non-compounded) having a wide range of solubilities. A 96 deep-well plate was fitted with 1.5 mL Cole-Parmer high throughput screening assay glass tubes and a liner/lid to prevent sample evaporation and cross-contamination. Polymer samples (0.05 g) were placed in the vials with 0.75 mL of various solvents (Table 4) in triplicate. The vials were placed in the well plate and capped, and the plate was placed on an orbital shaker and shaken at 1000 rpm for 24 hours. Each vial was visually inspected and solubility was rated as insoluble, borderline, or soluble. The area of solubility was mapped on a plot of solubility parameter vs. hydrogen-bonding capacity of the different solvents (the drawing). The solubility parameter was defined as the average of the highest and lowest solubility parameters for the solvents in which the sample was completely soluble. A high solubility parameter is consistent with increased oil resistance. The "ROMP HNBR" had an estimated solubility parameter of 9.5 (cal/cc)$^{1/2}$, much higher than that of butadiene rubber and comparable to that of Zetpol® 3310 HNBR and chloroprene (Table 3). The comparatively higher solubility parameter value seen for the Zetpol 2000 HNBR (~37 wt % acrylonitrile content; 10.5 (cal/cc)$^{1/2}$) may at least partially reflect the lower molecular weight of the ROMP-derived material.

TABLE 4

| Solvent | Solubility parameter (cal/cc)$^{1/2}$ | Hydrogen-bonding capacity |
|---|---|---|
| n-Heptane (C7) | 7.3 | 0 |
| Cyclohexane (cycC6) | 8.2 | 0 |
| Toluene (T) | 8.9 | 4.5 |
| 2-Ethylhexanol (EH) | 9.5 | 18.7 |
| 2-Ethylbutanol (EB) | 10.5 | 18.7 |
| n-Butanol (B) | 11.4 | 18.7 |
| Acetonitrile (CAN) | 11.9 | 6.3 |
| Dimethylformamide (DMF) | 12.1 | 11.7 |
| Ethanol (EtOH) | 12.9 | 10.8 |
| Propylene carbonate (PC) | 13.3 | 4.9 |
| Methanol (MeOH) | 14.5 | 18.7 |
| Propylene glycol (PG) | 15.0 | 20.6 |
| Ethylene glycol (EG) | 17.1 | 20.6 |
| Diisobutyl ketone (DIBK) | 7.8 | 8.4 |
| Butyl acetate (BuAc) | 8.5 | 8.8 |
| Dimethyl acetamide (DMA) | 10.8 | 12.3 |
| Nitromethane (NM) | 12.7 | 2.5 |
| Nitroethane (NE) | 11.1 | 2.5 |
| Methylene chloride (MC) | 9.7 | 1.5 |

Example 12

Comparison of ROMP-Derived Materials to Existing Elastomers: 50° C. Oil Swell Weight per cent oil swell for the hydrogenated poly((Z)-3-(cyclooct-4-enyl)propanenitrile) "ROMP HNBR" prepared in Example 6 and comparative commercial elastomers were measured in triplicate using a modified version of the ASTM D471 test (Standard Test Method for Rubber Properties—Effect of Liquids). Specimens of each polymer (~1 g, carefully chosen to ensure uniform sample shape and size) were submerged completely in 20 mL of IRM 903 oil (ASTM oil from Calumet Lubricants Company, distributed by R.E. Carroll Company) in a tube, leaving sufficient space for the sample to expand. The tube was capped and maintained at 50° C. in an oven for 48 hours with no sample agitation. The specimen was removed from the oil, briefly dipped in acetone, patted dry with a tissue, and weighed. Swell was calculated as: Wt % swell=(100)[(wt after immersion−initial wt)/(initial wt)]. The "ROMP HNBR" exhibited a swell of 49.8 wt %, much lower than that for unfunctionalized Vistalon rubber and comparable to that for chloroprene rubber and commercial NBR having 19-22 wt % acrylonitrile content (Table 3). While the value seen for the "ROMP HNBR" was higher than the oil swell values observed for the Zetpol HNBRs (4.2-14.1 wt %), this may at least partially reflect its lower molecular weight.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A functionalized polyalkenamer comprising repeating units of ethylene, butadiene, and a polar group-substituted α-olefin termonomer, said α-olefin termonomer having at least four carbons and having its polar group spaced by at least one carbon from the polymerizing olefin unit.

2. The functionalized polyalkenamer of claim 1 wherein said polar moiety of the α-olefin termonomer is in the w-position relative to the polymerizing olefin unit.

3. The functionalized polyalkenamer of claim 1 wherein said polar moiety is selected from —CN, —$CO_2$R, —C(═O)R, and —S(═O)Ph, where R is an alkyl group having from one to ten carbon atoms or an aryl group having from six to fourteen carbon atoms.

4. The functionalized polyalkenamer of claim 1 wherein said polar moiety comprises a nitrile group.

5. A functionalized polymer produced by hydrogenating the functionalized polyalkenamer of claim 1, said hydrogenated functionalized polymer comprising repeating units of ethylene, hydrogenated 1,4-enchained butadiene and a polar group-substituted α-olefin comonomer, said α-olefin comonomer having at least four carbons and having its polar moiety spaced by at least one carbon from the polymerizing olefin unit.

6. The functionalized polymer of claim 5 wherein said polar moiety of the α-olefin comonomer is in the ω-position relative to the polymerizing olefin unit.

7. The functionalized polymer of claim 5 wherein said polar moiety is selected from —CN, —$CO_2$R, —C(═O)R, and —S(═O)Ph, where R is an alkyl group having from one to ten carbon atoms or an amyl group having from six to fourteen carbon atoms.

8. The functionalized polymer of claim 5 wherein said polar moiety comprises a nitrile group.

9. A functionalized polyalkenamer comprising repeating units of ethylene, butadiene, and 4-pentenenitrile.

10. A functionalized polymer produced by hydrogenating the functionalized polyalkenamer of claim 9, said hydrogenated functionalized polymer comprising repeating units of ethylene, hydrogenated 1,4-enchained butadiene and 4-pentenenitrile.

* * * * *